United States Patent [19]

Delhommer et al.

[11] Patent Number: 4,704,213

[45] Date of Patent: Nov. 3, 1987

[54] ENCAPSULATED OIL ABSORBENT POLYMERS AS LOST CIRCULATION ADDITIVES FOR OIL BASED DRILLING FLUIDS

[75] Inventors: Harold J. Delhommer, Houston; Clarence O. Walker, Richmond, both of Tex.

[73] Assignee: Texaco Inc., White Plains, N.Y.

[21] Appl. No.: 737,990

[22] Filed: May 28, 1985

[51] Int. Cl.$^4$ .................. C09K 7/06; C09K 7/00
[52] U.S. Cl. .................. 252/8.512; 252/8.515; 175/72; 428/402.24; 523/130; 523/207; 523/210
[58] Field of Search .......... 252/8.5 LC, 8.5 M, 8.512, 252/8.515; 175/72; 427/213.3; 428/402.24, 402.2, 403, 407; 523/130, 207, 201, 210, 206

[56] References Cited

U.S. PATENT DOCUMENTS

| | | | |
|---|---|---|---|
| 2,836,555 | 5/1958 | Armentrout | 252/8.5 |
| 2,890,169 | 6/1959 | Prokop | 252/8.5 |
| 3,078,920 | 2/1963 | ten Brink | 166/33 |
| 3,082,823 | 3/1963 | Hower | 166/29 |
| 3,316,965 | 5/1967 | Watanabe | 175/72 |
| 3,448,800 | 6/1969 | Parker et al. | 166/294 |
| 3,878,175 | 4/1975 | Steckler | 260/78.5 |
| 3,909,421 | 9/1975 | Gaddis | 252/8.55 |
| 3,971,852 | 7/1976 | Brenner et al. | 426/103 |
| 4,036,301 | 7/1977 | Powers et al. | 166/293 |
| 4,078,612 | 3/1978 | Gallus | 166/299 |
| 4,128,528 | 12/1978 | Frisque et al. | 260/42.55 |
| 4,172,031 | 10/1979 | Hall et al. | 210/36 |
| 4,182,677 | 1/1980 | Bocard et al. | 210/36 |
| 4,191,813 | 3/1980 | Reed et al. | 521/31 |
| 4,240,800 | 12/1980 | Fischer et al. | 44/51 |
| 4,261,422 | 4/1981 | White et al. | 166/305 |
| 4,263,407 | 4/1981 | Reed et al. | 521/33 |
| 4,269,279 | 5/1981 | House | 175/66 |
| 4,362,566 | 12/1982 | Hinterwaldner | 106/85 |
| 4,384,095 | 5/1983 | Reed et al. | 526/293 |
| 4,391,925 | 7/1983 | Mintz et al. | 523/130 |
| 4,427,793 | 1/1984 | Reed et al. | 521/32 |
| 4,428,843 | 1/1984 | Cowan et al. | 252/8.5 |
| 4,442,241 | 4/1984 | Drake et al. | 523/130 |
| 4,445,576 | 5/1984 | Drake et al. | 166/291 |
| 4,475,594 | 10/1984 | Drake et al. | 166/294 |
| 4,498,995 | 2/1985 | Gockel | 252/8.5 |
| 4,503,170 | 3/1985 | Drake et al. | 523/130 |
| 4,622,193 | 11/1986 | Kresge et al. | 428/407 |
| 4,633,950 | 1/1987 | Delhommer et al. | 175/72 |
| 4,635,726 | 1/1987 | Walker | 175/72 |
| 4,664,816 | 5/1987 | Walker | 252/8.512 |

*Primary Examiner*—Herbert B. Guynn
*Assistant Examiner*—J. E. Thomas
*Attorney, Agent, or Firm*—Jack H. Park; Kenneth R. Priem; Harold J. Delhommer

[57] ABSTRACT

The disclosed invention is a novel drilling fluid additive for use in reducing lost circulation in wellbores and a method for employing the invention additive for reducing such lost circulation. The invention additive is a highly oil absorbent polymer encapsulated by a reaction-preventive protective casing to prevent the polymer from expanding by absorbing oil until it is desired to breach the casing. The reaction-preventive protective casing may be a film which will dissolve after a desired time of residence in the borehole or a film or clay which can be ruptured in the formation, releasing the oil absorbent polymer to expand by absorbing oil. The substantially expanded polymer will seal off their zones and fissures, reducing lost circulation.

12 Claims, No Drawings

ENCAPSULATED OIL ABSORBENT POLYMERS AS LOST CIRCULATION ADDITIVES FOR OIL BASED DRILLING FLUIDS

BACKGROUND OF THE INVENTION

This invention is related to concurrently filed U.S. patent applications Ser. No. 738,000, filed May 28, 1985, now U.S. Pat. No. 4,635,726, Ser. No. 737,992, filed May 28, 1985, now U.S. Pat. No. 4,664,816, and Ser. No. 737,991, filed May 28, 1985, now U.S. Pat. No. 4,633,950.

The invention concerns novel additives for reducing lost circulation when oil based drilling fluids are used and a method for reducing such lost circulation. More particularly, the lost circulation additives are encapsulated hydrocarbon absorbent polymers which will be unable to absorb hydrocarbon and expand to plug fissures and thief zones until absorption is desired.

Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost to the formation. Drilling fluid can leave the borehole through large or small fissures or fractures in the formation or through pores in the rock atrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances are now pumped down well bores in attempts to reduce the large losses of drilling fluid, generally aqueous drilling fluid, to fractures and the like in the surrounding formation. Different forms of cellulose are the preferred materials employed. Some substances which have been pumped into well bores to control lost circulation are: almond hulls, walnut hulls, bagasse, dried tumbleweed, paper, coarse and fine mica, and even pieces of rubber tires. These and other prior art additives are described in U.S. Pat. No. 4,498,995.

Another process that is employed to close off large lost circulation problems is referred to in the art as gunk squeeze. In the gunk squeeze process, a quantity of powdered bentonite is mixed in diesel oil and pumped down the well bore. Water injection follows the bentonite and diesel oil. If mixed well, the water and bentonite will harden to form a gunky semi-solid mess, which will reduce lost circulation. Problems frequently occur in trying to adequately mix the bentonite and water in the well. The bentonite must also be kept dry until it reaches the desired point in the well. This method is disclosed in U.S. Pat. No. 3,082,823.

Many of the methods devised to control lost circulation involve the use of a water expandable clay such as bentonite which may be mixed with another ingredient to form a viscous paste or cement. U.S. Pat. No. 2,890,169 discloses a lost circulation fluid made by forming a slurry of bentonite and cement in oil. The slurry is mixed with a surfactant and water to form a composition comprising a water-in-oil emulsion having bentonite and cement dispersed in the continuous oil phase. As this composition is pumped down the wellbore, the oil expands and flocculates the bentonite which, under the right conditions, forms a filter cake on the wellbore surface in the lost circulation area. Hopefully, the filter cake will break the emulsion causing the emulsified water to react with the cement to form a solid coating on the filter cake. But such a complex process can easily go wrong.

U.S. Pat. No. 3,448,800 discloses another lost circulation method wherein a water soluble polymer is slurried in a nonaqueous medium and injected into a well. An aqueous slurry of a mineral material such as barite, cement or plaster of paris is subsequently injected into the well to mix with the first slurry to form a cement-like plug in the wellbore.

U.S. Pat. No. 4,261,422 describes the use of an expandable clay such as bentonite or montmorillonite which is dispersed in a liquid hydrocarbon for injection into the well. After injection, the bentonite or montmorillonite will expand upon contact with water in the formation. Thus, it is hoped that the expanding clay will close off water producing intervals but not harm oil producing intervals.

A similar method is disclosed in U.S. Pat. No. 3,078,920 which uses a solution of polymerized methacrylate dissolved in a nonaqueous solvent such as acetic acid, acetic anhydride, propionic acid and liquid aliphatic ketones such as acetone and methyl-ethyl ketone. The methacrylate will expand upon contact with formation water in the water producing intervals of the well.

It has also been proposed to mix bentonite with water in the presence of a water soluble polymer which will flocculate and congeal the clay to form a much stronger and stiffer cement-like plug than will form if bentonite is mixed with water. U.S. Pat. No. 3,909,421 discloses such a fluid made by blending a dry powdered polyacrylamide with bentonite followed by mixing the powder blend with water. U.S. Pat. No. 4,128,528 claims a powdered bentonite/polyacrylamide thickening composition prepared by mixing a water-in-oil emulsion with bentonite to form a powdered composition which rapidly becomes a viscous stiff material when mixed with water. U.S. Pat. Nos. 4,503,170; 4,475,594; 4,445,576; 4,442,241; and 4,391,925 teach the use of a water expandable clay dispersed in the oily phase of a water-in-oil emulsion containing a surfactant to stabilize the emulsion and a polymer dispersed in the aqueous phase. When the emulsion is sheared, it breaks and a bentonite paste is formed which hardens into a cement-like plug. The patent discloses the use of such polymers as polyacrylamide, polyethylene oxide and copolymers of acrylamide and acrylic or methacrylic acid.

Highly absorbent spongy polymer materials which may absorb large quantities of water and hydrocarbons causing an increase in volume are disclosed in U.S. Pat. No. 3,878,175. These are copolymers of an alkyl acrylate and a heterocyclic N-vinyl monomer containing a carbonyl functionality and a cross-linking agent in the presence of a hydrophobic liquid diluent. U.S. Pat. No. 4,182,677 discloses that natural and synthetic rubbers also swell in size upon absorbing hydrocarbons.

A group of similar oil absorbent polymers are disclosed in U.S. Pat. Nos. 4,191,813; 4,263,407; 4,384,095 and 4,427,793. U.S. Pat. No. 4,191,813 discloses lightly cross-linked copolymers containing at least 40% by weight of vinylbenzyl chloride, the balance of monomers, if any, comprising a major portion of aromatic monomers, with the copolymer being cross-linked in a swollen state by a Lewis acid catalyst. The preferred comonomers are one or more of styrene, divinylbenzene and acrylonitrile. U.S. Pat. No. 4,263,407 discloses similar copolymers wherein the copolymer is post-cross-linked in a swollen state in the presence of a Friedel-Crafts catalyst with a cross-linker selected from a polyfunctional alkylating or acylating agent and a sulfur halide.

Another group of highly hydrocarbon absorbent copolymers is disclosed in U.S. Pat. Nos. 4,384,095 and 4,427,793. They describe a cross-linked linear addition copolymer which contains repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer. The preferred comonomers are styrene, methylmethacrylate, vinyltoluene and vinylpyridine. The copolymers disclosed in all four of these patents absorb from two to ten times their weight in hydrocarbons and may swell up to ten times their original volume.

Oleophilic polymers for separating oil from water which show significant swelling in volume upon absorption of oil are described in U.S. Pat. No. 4,172,031. These polymers include polymers of styrenes and substituted styrenes, polyvinyl chloride copolymers of vinylchloride such as a copolymer of 60 wt % vinylchloride and 40 wt % vinylacetate, polymers and copolymers of vinylidene chloride and acrylonitrile, and acrylic polymers such as polymers of methylmethacrylate and ethylacrylate, styrene and divinylbenzene copolymers and alkyl styrene polymers and copolymers. The reference discloses that these polymers show significant swelling in volume upon absorption of oil.

A process for treating cellulosic fibers, particularly bagasse, for use as oil absorbent and hydrophobic materials as described in U.S. Pat. No. 4,240,800. The bagasse fibers are saturated with water, boiled extensively to extract any remaining sugar, and then dried to a moisture content of 2 to 3% to produce hydrophobic fibers which are capable of absorbing up to about 25 times their weight in oil. U.S. Pat. No. 4,428,843 describes the use of hydrophobic, organophilic cellulose fibers as a seepage or spurt loss control agent for oil based drilling fluids wherein the cellulose is added to the drilling fluid. The reference also discloses adding the cellulose fibers to an aqueous drilling mud containing less than twenty parts per billion of oil.

The last few years have witnessed a drastic increase in research on encapsulated products and methods to produce such products. This is particularly so in the pharmaceutical field. And it is now becoming recognized that encapsulation technology may be useful in many other fields.

U.S. Pat. No. 3,971,852 describes a process for encapsulating various fragrance oils such as oils with citrus and spice odors. The oils are encapsulated in a matrix comprised of polysaccharide and polyhydroxy compounds by converting an emulsion of the fragrance oil droplets in a solution of the matrix ingredients to an encapsulated solid state during a spray drying process. The patent also mentions that miscellaneous chemicals can be encapsulated by the invention method such as drilling fluids and waxes.

U.S. Pat. No. 4,269,279 discloses the use of plastic coated magnetic particles in a bead form to increase lubrication for drilling fluids. The encapsulated ferromagnetic particles can be recovered for reuse with a magnetic separator.

An encapsulated invention which has been disclosed for use in boreholes is described in U.S. Pat. No. 4,078,612. The patent describes an explodable material encapsulated in natural gums slurried in a liquid vehicle. The material is pumped into the formation around the wellbore and exploded to increase permeability.

The use of bentonite encapsulated within a water-insoluble polymeric coating has been disclosed for lost circulation control. U.S. Pat. No. 2,836,555 describes bentonite encapsulated within a polymeric coating having a tiny hole drilled therethrough. When the encapsulated bentonite is pumped down the wellbore, water will seep through the hole in the encapsulation causing the bentonite to swell and ultimately rupture the coating.

Another U.S. Pat. No. 4,036,301 describes an encapsulated material useful in cementing a well, wherein a cement accelerator is encapsulated in a waxy material and placed within a highly retarded cement slurry. The cement slurry is pumped into the well with the encapsulated accelerator. After proper placement of the cement, circulation is decreased so that the temperature of the cement fluid approaches the bottom hole temperature of the well and melts the encapsulated material, freeing the accelerator which sets the cement.

U.S. Pat. No. 4,362,566 discloses an additional use of encapsulated materials. The patent suggests encapsulating one component of a two or more component adhesive or cement mixture so that the adhesive or cement will not set until the encapsulated component is freed from its reaction-preventive casing.

SUMMARY OF THE INVENTION

The invention is a novel drilling fluid additive for reducing lost circulation in wellbores. The lost circulation additive is a highly oil absorbent polymer encapsulated by a reaction-preventive protective casing to prevent the polymer from absorbing oil and substantially increasing in size in the formation and borehole until it is desired to breach the casing. The polymer must have the characteristic property of absorbing oil and swelling in size, or the property of absorbing or absorbing oil so that the polymer will bind with the oil to form a paste or gel.

The reaction-preventive protective casing may be a film which will dissolve after a desired time of residence in the borehole, a film substance which will dissolve or melt at a desired temperature in the borehole or a substance such as clay which can be ruptured in the formation. Once the casing around the polymer is dissolved, melted or breached in some manner, the polymer will be released to absorb oil from the oil based drilling fluid in the formation or the borehole, causing a drastic increase in polymer size. Thus, fissures and pores through which drilling fluid was being lost will be substantially closed by the now expanded polymer.

Several methods for employing the invention drilling fluid additive and reducing lost circulation are also disclosed. It is most preferred, but not necessary, to deliver the encapsulated polymer to the lost circulation zone in a small slug of drilling fluid. A clay encapsulated oil absorbent polymer can be placed in the oil based drilling fluid and circulated in the wellbore. Fractures and large pores which are responsible for lost circulation of drilling fluids will claim additional drilling fluid including the encapsulated polymer. The circulating jets of the drill bit can be used to rupture the clay encapsulation, releasing the polymer to absorb oil and expand, closing off the lost circulation zone.

Another method involves the use of a film which will melt at a desired temperature between the mud circulating temperature and the formation temperature. Once circulation has ceased, the temperature of the drilling fluid will rise and approach the formation temperature. The film substance encapsulating the highly oil absorbent polymer will melt, releasing the polymer to absorb oil and producing an expanded material which will seal off fractures and large pores. At this time, circulation of the drilling fluid is resumed to flush all residue from the wellbore. The highly expanded polymer in the pores and fractures will remain in the formation, blocking these avenues of lost circulation.

DETAILED DESCRIPTION

Drilling fluids are formulated to intentionally plug porous formations during drilling in order to stabilize the borehole and to control fluid loss. However, formations are frequently encountered that are so porous as to increase the loss of drilling fluids beyond an acceptable limit. Furthermore, a borehole may penetrate a fracture in the formation through which most of the drilling fluid may be lost.

There is a large unfulfilled need for additives and methods to control lost circulation problems with oil based drilling fluids. Although many additives of varying effectiveness exist to control lost circulation for aqueous muds, there are no effective lost circulation additives for oil based drilling fluids. Furthermore, lost circulation problems can be extremely expensive when oil based muds are involved. The cost of an oil based mud can range from $100.00 to $150.00 per barrel, depending on mud weight. A 13,000 foot well may use 1500 to 3000 barrels of oil based mud depending on the hole size. Deeper wells could, of course, use more mud. Because of the high cost of oil based muds, a loss of only 1000 barrels of mud in a well may cost $100,000 to $150,000.

Not only is there no effective lost circulation treatment for expensive oil based muds, but it appears oil based muds are more prone to lost circulation problems than aqueous muds. There are at least two reasons for this to occur. First, the rheological properties of the system may be increasing significantly under downhole conditions so as to increase the equivalent circulating density to a point above the frac gradient of the formation being drilled. As a result, the formation opens and takes the fluid. Second, oil based muds do not, by nature, have the solids content or particle size distribution of aqueous phase muds. Therefore, when a zone is penetrated that will take fluid, there are insufficient particles present of the size necessary to effectively bridge off and seal the zone.

Any polymer which will significantly increase in size after oil absorption may be encapsulated and used as the last circulation additive of the present invention. Polymers which absorb water in addition to hydrocarbons may also be encapsulated for use in the invention. But water and oil absorbing polymers may require a different method of encapsulation than oil absorbing and hydrophobic polymers.

A group of oil absorbent polymers are disclosed in U.S. Pat. Nos. 4,191,813; 4,263,407; 4,384,095 and 4,427,793, the disclosures of which are incorporated herein by reference. U.S. Pat. No. 4,191,813 discloses lightly cross-linked copolymers containing at least 40% by weight of vinylbenzyl chloride, the balance of monomers, if any, comprising a major portion of aromatic monomers, with the copolymer being cross-linked in a swollen state by a Lewis acid catalyst. The preferred comonomers are one or more of styrene, divinylbenzene and acrylonitrile. U.S. Pat. No. 4,263,407 discloses similar copolymers wherein the copolymer is post-cross-linked in a swollen state in the presence of a Friedel-Crafts catalyst with a cross-linker selected from a polyfunctional alkylating or acylating agent and a sulfur halide.

The hydrocarbon absorbent copolymers of U.S. Pat. Nos. 4,384,095 and 4,427,793 are cross-linked linear addition copolymers which contain repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer. The preferred comonomers are styrene, methylmethacrylate, vinyltoluene and vinylpyridine. The copolymers disclosed in all four of these patents absorb from two to ten times their weight in hydrocarbons and may swell up to ten times their original volume.

Oleophilic polymers for separating oil from water which show significant swelling in volume upon absorption of oil are described in U.S. Pat. No. 4,172,031, the disclosure of which is incorporated herein by reference. These polymers include polymers of styrenes and substituted styrenes, polyvinyl chloride copolymers of vinylchloride such as a copolymer of 60 wt % vinylchloride and 40 wt % vinylacetate, polymers and copolymers of vinylidene chloride and acrylonitrile, and acrylic polymers such as polymers of methylmethacrylate and ethylacrylate, styrene and divinylbenzene copolymers and alkylstyrene polymers and copolymers. The reference discloses that these polymers show significant swelling in volume upon absorption of oil.

A process for treating cellulosic fibers, particularly bagasse, for use as oil absorbent and hydrophobic materials is described in U.S. Pat. No. 4,240,800, the disclosure of which is incorporated herein by reference. The bagasse fibers are saturated with water, boiled extensively to extract any remaining sugar, and then dried to a moisture content of 2 to 3% to produce hydrophobic fibers which are capable of absorbing up to about 25 times their weight in oil.

U.S. Pat. No. 3,878,175, the disclosure of which is incorporated herein by reference, describes highly water absorbent and oil absorbent spongy polymers which can be encapsulated for use in the present invention. The highly absorbent copolymers are prepared by heating a solution in a hydrophobic liquid diluent of a mixture consisting essentially of from about 30 to about 90% by weight of a heterocyclic N-vinyl monomer containing a carbonyl functionality adjacent to the nitrogen in its heterocyclic moiety, about 10 to about 70% by weight of a comonomer selected from the class of vinyl esters and acrylate esters, about 0 to about 30% by weight of acrylamide or methacrylamide, and from about 0.5 to about 12% by weight, based on the total weight of the comonomer mixture of said heterocyclic N-vinyl monomer and said ester of a polyethylene glycol dimethacrylate as cross-linking agent, said heating conducted in the absence of atmospheric oxygen at a temperature ranging from ambient to about 60° C. for a period of time sufficient to yield a slightly gelled mass, followed by continued heating in an inert atmosphere to a temperature of about 100° C. for a period of about 1 to about 3 hours. Such spongy polymers readily swell upon immersion in water or organic substances to a water content of about 30 to 95%.

Natural and synthetic rubbers, which also swell upon oil absorption may be employed in the present invention. A method of treating rubber particles to increase their oil swelling capabilities by treating the rubber with an aqueous solution or emulsion of an organic acid at about 0°–150° C. for about 15 minutes to 3 hours is disclosed in U.S. Pat. No. 4,182,677, the disclosure of which is incorporated herein by reference. This method may be used to create an oil absorbing polymer to be encapsulated for the invention.

Of course, other compounds which absorb oil and expand in size which are not mentioned herein, may also be encapsulated to control lost circulation in aqueous drilling fluids. A further option within the scope of the invention is to employ two or more different polymers, each encapsulated separately, which may react with each other to form a stronger material to close off the loss circulation zone. If the encapsulated polymer is structurally weak, it may be supported on a substrate before encapsulation to add strength to the polymer.

Different types of reaction-preventive protective casings can be employed to encapsulate the highly oil absorbent polymer and prevent it from absorbing oil until the desired time. The casing may be a film which will dissolve after a desired time of residence in the borehole, releasing the polymer. An example is a partially oil soluble casing which will take a measured time to dissolve, said time be sufficiently long to permit the encapsulated polymer to be circulated in the borehole and lost to the formation pores and fractures desired to be sealed off.

A second possibility is a film casing which will dissolve at desired temperatures, releasing the polymer so it may absorb the oil in the oil based mud. It is quite easy to raise the temperature of the mud environment in the drilling hole by slowing down or stopping mud circulation. Once circulation has ceased, the temperature of the formation will heat the drilling fluid constantly until the drilling fluid reaches formation temperature. Thus, the casing would be designed to dissolve at a temperature between the bottom hole circulating temperature and the formation temperature.

A hydrocarbon formation along the Gulf Coast may have a formation temperature of 248° F. which will heat up a 90° F. drilling fluid to a temperature of about 210° F. at the bottom of a 16,000 foot hole while circulating mud. This assumes a temperature gradent of 1.1° F. per hundred feet of well depth. Thus, it is necessary to have a film casing which will dissolve somewhere between the temperatures of 210° F. and 248° F.

Since it is preferred to have some margin of safety over the bottom hole circulation temperature of 210° F., it is preferred to select a wax or film casing which will dissolve within the temperature range of about 220° F. to about 247° F. With such a reaction-preventive protective casing, the oil absorbent polymer will not be released for oil absorption until mud circulation is ceased and the formation has had some time to heat up the drilling fluid to near the formation temperature of 248° F. Since it is undesirable to have the protective casing melt or dissolve before the encapsulated polymer is spotted at the right location, the protective casing should be designed with a melting point close to the formation temperature. It is also preferred to have the polymer released for reaction in the well within about 4 to 6 hours to allow sufficient time for the polymer to be placed within the loss zone.

Another possible encapsulation would be a casing which would allow hydrocarbons to diffuse through the casing to the polymer. The polymer would swell in size and rupture the casing, bringing the polymer into complete contact with the oil environment.

An additional method of encapsulating the oil absorbing polymer is to encapsulate the polymer with clay. The oil absorbing polymer can be mixed in an aqueous clay slurry. The mixture is then dried and ground up to the desired particle size. If the particles are not too small of a size, it is not even necessary to neutralize or wash polymer off the outside of the granules before using. The clay encapsulation can be ruptured by shearing with jets in the wellbore.

The reaction-preventive casing must be substantially chemically inert to the encapsulated polymer and to the external medium around it. The casing should be resistant to diffusion in either direction, somewhat resistant to breakage from mechanical forces, and generally stable through temperature variations. Additionally, the casing must dissolve or melt at the proper time.

The above described properties are general properties and are subject to exceptions. If a reaction-preventive protective casing is employed which will dissolve after a given period of time in a medium to release the oil absorbent polymer, preferably at least several hours, the protective casing will not be chemically inert to the external medium containing it. Protective casings are also employed in the pharmaceutical industry which permit limited diffusion of the encased material through the protective encapsulation. Stability of temperature variation is also important since it may be necessary for the encapsulated polymer to go from an 80° F. temperature to about a 200° F.–350° F. temperature without releasing the polymer.

The capsules must also be able to resist substantial physical and mechanical forces placed on the protective casings without breaking. The encapsulation must remain sufficiently intact during the pumping and circulation process so that a significant amount of oil absorbent polymer is not released into the drilling fluid before the desired time. The shearing forces placed on the casings may be substantial during mud circulation. Additionally, the protective casings must be able to survive storage, wherein capsule breakage may occur as a result of the weight of the encapsulated polymer stored in barrels and tanks.

For ease of encapsulation, spherical shaped particles are generally preferred for most encapsulation processes. However, a spherical shape is not crucial for some coating processes. Furthermore, a spherical shape is stronger structurally than other shapes, and is more likely to survive unbroken in storage and mud circulation.

The encapsulation process can be one of many methods well known in the art, such as spray coating, condensation, electrostatic coating, and solvent deposition. If a casing is employed which will be ruptured later or melt at a desired temperature within the borehole, it is not even necessary that the casing be of a uniform thickness. The casing need not completely encapsulate the polymer, provided that polymer outside of the casing is removed or neutralized by oil absorption or some other method prior to placing the encapsulated polymer within the drilling fluid. If the surface area of the encapsulated polymer is large in comparison to the amount of polymer outside of the casing, neutralization may not be needed. U.S. Pat. Nos. 3,971,852; 4,036,301; and 4,362,566 describe several methods of encapsulating materials. The disclosures of these patents; U.S. Pat. Nos. 3,971,852; 4,036,301; and 4,362,566; are herein incorporated by reference.

The encapsulated particles may be sized over a wide range. The size of the passages through the circulating jets in the drill bit is the absolute maximum particle size. However, the encapsulated particles should be of a small enough size so as to be able to enter the formation through fissures, small fractures and large pores. A preferred range of particle size is about 0.1 microns to 5 millimeters. Depending upon the encapsulation process, a smaller encapsulated particle size may be more expensive than a larger particle size. The cost of the clay encapsulation process noted above, however, should be relatively independent of particle size. It is believed that a larger particle size would result in a stronger blockage of a lost circulation zone such as a large fracture. The particles should be sized according to the properties of the formation and the lost circulation zone.

The invention also includes a method for reducing the lost circulation of drilling fluids in a borehole by employing the encapsulated oil absorbent polymer. The method steps are, of course, dependent upon the particular type of encapsulation employed. When a clay encapsulation is used, the casing can be ruptured with the circulating jets of the drill bit, freeing the polymer to absorb oil.

If a film with the desired melting point range encapsulates the polymer, the encapsulated polymer is circulated through the borehole in the drilling fluid until the encapsulated polymer is properly spotted. The circulation of the drilling fluid is stopped for a sufficient time to allow the temperature of the drilling fluid to be raised above the melting point of the film casings. The film dissolves or melts, releasing the polymer to absorb oil and expand, reducing lost circulation of drilling fluid to thieving zones and fissures. Circulation is then resumed to clear the borehole of undesired compounds.

This embodiment of the invention is particularly effective for closing off fractures and large pores without clogging the borehole. This is because the underground formation heats up the drilling fluid in the borehole starting at the outside of the borehole and working towards the center of the borehole. Thus, the film casings will dissolve in the lost circulation zone outside of the borehole releasing the polymer to absorb oil at a substantially faster rate than the film casings will dissolve in the middle of the borehole. Substantial expansion or binding of the polymer with oil will occur in the formation outside of the borehole and on the edges of the borehole before significant polymer is released from its protective casing at the center of the borehole, permitting resumed circulation to clean out the borehole of undesired compounds. This is particularly true when the invention method is used to seal off fractures which the borehole has penetrated. Normally, the fractures are smaller than the wellbore so that the oil absorbent polymer will be released in the fractures long before it is released in the borehole.

Even if substantial polymer is released in the borehole, no damage will occur. The drilling fluid containing the polymer can still be circulated out of the hole, leaving behind the highly expanded, trapped polymer in the formation. The drill bit can be raised after the treatment and then brought back down to flush and clean the expanded polymer from the hole.

The use of a small pill or slug of drilling fluid containing the lost circulation additive is the preferred means of delivery to a lost circulation zone. A slug of drilling fluid, containing as little as 100 gallons of drilling fluid with the encapsulated polymer, can be introduced into the wellbore. Once the encapsulated polymer slug is properly spotted at the lost circulation zone, the rams of the blowout preventer are closed and additional fluid is pumped into the well, forcing the encapsulated polymer slug into the lost circulation zone. A clay casing can be ruptured and the polymer forced into the lost circulation zone by the use of the circulating jets of the drill bit.

The encapsulated polymer should be added to the drilling fluid in an amount sufficient to seal off the lost circulation zone. Depending on the type of polymer, the encapsulation used, and the formation and lost circulation zone drilled through, the drilling fluid should contain about two to about 250 pounds of encapsulated polymer per barrel of drilling fluid, preferably located only in the small slug of drilling fluid targeted for the lost circulation zone.

Usually, it is immediately apparent when a fracture is penetrated by the wellbore. The mud pressure will drop and less drilling fluid will be circulated back to the top of the hole. Large fractures can be responsible for draining off almost all of the drilling fluid. When this occurs, the encapsulated polymer should be preferably placed in a slug of drilling fluid and spotted at the thief zone to be released to close off the zone. Sufficient drilling fluid containing the encapsulated polymer is circulated to insure that the fracture contains substantial amounts of the treated drilling fluid. Of course, the encapsulated polymer will accompany the drilling fluid into the fracture. Circulation is then stopped to allow the polymer to set up.

If a casing which dissolves at a desired temperature is used, circulation is ceased for a time sufficient for the film casings to melt and release the oil absorbent polymer, and to allow the polymer to set up. Circulation is then resumed. Drilling fluid pressure will shortly begin increasing and more mud will be circulated back to the surface of the well. The increase in pressure and mud returned to the surface is a strong indication that the invention has worked and the fracture is sealed. Circulation is then increased to clear the borehole of undesired compounds.

Many other variations and modifications may be made in the concepts described above by those skilled in the art without departing from the concepts of the present invention. Accordingly, it should be clearly understood that the concepts in the description are illustrative only and are not intended as limitations on the scope of the invention.

What is claimed is:

1. A drilling fluid additive for reducing lost circulation of oil based drilling fluids in a borehole penetrating an underground formation, comprising:

an oil absorbent polymer which expands upon absorbing oil, said polymer encapsulated by a reaction-preventive protective casing to prevent the polymer from absorbing oil and expanding until it is desired to breach the casing, said oil absorbent polymer being a cross-linked linear addition polymer containing repeating units of vinylbenzyl alcohol and at least one other alpha, beta-monoethylenically unsaturated monomer different from vinylbenzyl alcohol, wherein the vinylbenzyl alcohol units comprise about 0.5% to about 20% by weight of the linear polymer.

2. A drilling fluid additive for reducing lost circulation of oil based drilling fluids in a borehole penetrating an underground formation, comprising:

an oil absorbent polymer which expands upon absorbing oil, aaid polymer encapsulated by a reation-preventive protective casing to prevent the polymer from absorbing oil and expanding unitl it is desired to breach the casing, said oil absorbent polymer being a lightly cross-linked aromatic copolymer which is post-cross-linked in a swollen state in the presence of a Friedel-Crafts catalyst with a cross-linker selected from a polyfunctional alkylating or acylating agent and sulfur halide.

3. A drilling fluid additive for reducing lost circulation of oil based drilling fluids in a borehole penetrating an underground formation, comprising:

an oil absorbent polymer which expands upon absorbing oil, said polymer encapsulated by a reaction-preventive protective casing to prevent the polymer from absorbing oil and expanding until it is desired to breach the casing, said oil absorbent polymer being a lightly cross-linked copolymer containing at least 40% by weight of vinybenzyl chloride, with a balance of monomers comprising a major proportion of aromatic monomers, said lightly cross-linked copolymer being post-cross-linked in a swollen state with a Lewis acid catalyst.

4. The drilling fluid additive of claim 3, wherein the lightly cross-linked copolymer is a copolymer of vinylbenzyl chloride, styrene and divinylbenzene.

5. The drilling fluid additive of claim 3, wherein the lightly cross-linked copolymer is a copolymer of vinylbenzyl chloride, and divinylbenzene.

6. The drilling fluid additive of claim 3, wherein the lightly cross-linked copolymer is a copolymer of vinylbenzyl chloride, acrylonitrile and divinylbenzene.

7. A drilling fluid additive for reducing lost circulation of oil based drilling fluids in a borehole penetrating an underground formation, comprising:

an oil absorbent polymer which expands upon absorbing oil, said polymer encapsulated by a reaction-preventive protective casing to prevent the polymer from absorbing oil and expanding until it is desired to breach the casing, said oil absorbent polymer being a cellulose which is first saturated with water, boiled to extract any sugar, and dried to a moisture content of less than about 4%.

8. The drilling fluid additive of claim 7, wherein the cellulose is bagasse.

9. The drilling fluid additive of claim 7, wherein the cellulose is ground to a fiber length of less than about 5 millimeters.

10. A drilling fluid additive for reducing lost circulation of oil based drilling fluids in a borehole penetrating an undergound formation, comprising:

an oil absorbent polymer which expands upon absorbing oil, said polymer encapsulated by a reaction-preventive protective casing to prevent the polymer from absorbing oil and expanding until it is desired to breach the casing, said oil absorbent polymer prepared by heating a solution in a hydrophobic liquid diluent of a mixture consisting essentially of from about 30 to about 90% by weight of a heterocyclic N-vinyl monomer containing a carbonyl functionality adjacent to the nitrogen in a hetrocyclic moiety, about 10 to about 70% by weight of a comonomer selected from the class of vinyl esters and acrylate esters, about 0 to about 30% by weight of acrylamide or methacrylamide, and from about 0.5 to about 12% by weight, based on the total weight of the comonomer mixture of said hetrocyclic N-vinyl monomer and said ester of a polyethylene glycol dimethacrylate as cross-linking agent, said heating conducted in the absence of atmospheric oxygen at a temperature ranging from ambient to about 60° C. for a period of time sufficient to yield a slightly gelled mass, followed by continued heating in an inert atmosphere to a temperature of about 100° C. for a period of about 1 to about 3 hours to yield an opaque self supporting spongy mass.

11. A drilling fluid additive for reducing lost circulation of oil based drilling fluids in a borehole penetrating an underground formation, comprising:

an oil absorbent polymer which expands upon absorbing oil, said polymer encapsulated by a reaction-preventive protective casing to prevent the polymer from absorbing oil and expanding until it is desired to breach the casing, said oil absorbent polymer selected from the group consisting of natural rubbers and synthetic rubbers wherein the rubber is treated with an aqueous solution or emulsion of an organic acid at about 0° C. to about 150° C. for about 15 minutes to about 3 hours.

12. A method of reducing lost circulation of oil based drilling fluids in a borehole penetrating an underground formation, comprising:

adding an oil absorbent polymer which expands upon absorbing oil to a slug of drilling fluid, said polymer encapsulated with a clay, said polymer added in a quantity of about two to about 250 pounds of encapsulated polymer per barrel of oil based drilling fluid;

spotting the slug of drilling fluid and polymer within a lost circulation zone;

shearing the clay encapsulation with the circulating jets of the drill bit, permitting the encapsulated polymer to be released from its clay encapsulation and absorb oil and expand to close off the lost circulation zone; and resuming circulation to clear the borehole of undesired compounds.

* * * * *